United States Patent [19]
Malone et al.

[11] 3,810,214
[45] May 7, 1974

[54] FLASH EXTENDER

[75] Inventors: Harold L. Malone, East Rochester; Robert J. Bodensteiner, Rochester, both of N.Y.

[73] Assignee: Eastman Kodak Company, Rochester, N.Y.

[22] Filed: Mar. 24, 1972

[21] Appl. No.: 237,837

[52] U.S. Cl............................ 354/148, 240/1.3
[51] Int. Cl. ..................................... G03b 15/04
[58] Field of Search......... 95/11 L, 11.5 R; 240/1.3; 431/92, 93

[56] References Cited
UNITED STATES PATENTS
3,706,265   12/1972   Simon et al. .................... 95/11 L
3,590,706   7/1971    Millet............................. 95/11.5 R
3,581,637   6/1971    Harvey............................ 95/11 L
3,672,813   6/1972    Horton............................ 95/11.5 X Primary Examiner—Robert P. Greiner

[57] ABSTRACT

A flash extender, for a photographic camera adapted to receive and actuate a percussively ignitable flashlamp, having a socket, at least one push rod and a base. Insertion of the extender base into the camera flash socket aligns a push rod with the camera flash firing mechanism. Operation of the shutter release mechanism of the camera actuates the camera flash firing mechanism which causes the aligned push rod to be urged upwardly, thereby actuating a percussively ignitable flashlamp held in the socket of the flash extender. In a preferred embodiment, operation of the camera flash indexing mechanism causes rotation of the camera flash socket and the extender therewith to place a fresh flashlamp in firing position.

11 Claims, 7 Drawing Figures

PATENTED MAY 7 1974

PATENTED MAY 7 1974 3,810,214

FLASH EXTENDER

BACKGROUND OF THE INVENTION

1. Field of the Invention

This invention relates to flash photography and more particularly to an extender containing a mechanical flash actuating mechanism for use with photographic cameras having built-in mechanical flash actuating systems.

2. Description of the Prior Art

Photographers using color film for snapshots of human subjects frequently find the resulting color prints exhibit "redeye." This condition results when light from the flash unit is reflected by the retinas of the subject's eyes onto a color photographic film, thereby showing the pupils as red on the developed color print. Redeye may be reduced by moving the flash unit further from the camera's optical axis so that light from the flash unit reaches the subject at too great an angle to be reflected by the retinas onto the film.

In cameras using electrically actuated flashlamps, the flashlamp may be placed in any portion which can be reached by electrical connections from the camera flash actuating mechanism. Moreover, the flashlamp need not be physically connected to the camera. The only limitations on position are that the flashlamp not interfere with the operator's handling of the camera as positioning on the camera ends might do and that the flashlamp not produce undesirable lighting effects such as the shadows which might occur if the flashlamp were positioned under the optical axis. Thus, redeye can be prevented in larger cameras adapted for use with electrically ignitable flashlamps by positioning the flashlamp at a relatively large distance from the optical axis.

The development of photographic cameras adapted for use with disposable multilamp electrically actuated flash units has been accompanied by a reduction in the size of the camera so as to increase the ease of handling, storage, use, etc. As a consequence, the separation between a flash unit mounted on the camera and the camera's optical axis has been reduced, thereby accentuating the redeye problem. An extender for use in increasing this separation, for use with a camera having a built-in electrically actuated flash system is disclosed in U.S. Pat. No. 3,348,188.

Photographic cameras and flash units have recently been developed which may be actuated for flash photography without the use of batteries. Various embodiments of such cameras are available in the market. One example of such a camera may be found in U.S. Pat. No. 3,576,156. A socket for use in such a camera, for receipt of a percussively actuated multilamp flash unit, is disclosed in U.S. Pat. No. 3,630,131. The possible positions for a multilamp flash unit on such a camera are limited by the same considerations of operator convenience and prevention of undesirable lighting effects as for the electrically actuated flash camera. In addition, the flash actuating mechanism in such a camera should be located fairly close to the shutter actuating mechanism for several reasons. First, the closeness makes it easier to properly synchronize the firing of the flash unit with the opening of the shutter. Second such a location insures that sufficient energy is imparted to the firing mechanism to fire the flash unit, by minimizing energy losses due to frictional effects present in any elongated connecting mechanism between the shutter and flash unit actuating mechanisms. Thus, the choice of position for such a flash unit is more restrictive than for an electrically fired flash unit. Reduction in the size of the photographic camera and the more restrictive flash actuating positions available in a batteryless camera have both accentuated the problem of redeye.

BRIEF SUMMARY OF THE INVENTION

It is, therefore, an object of the present invention to provide a flash extender for increasing the distance between a flash unit and the optical axis of a camera having a built-in mechanical flash actuating mechanism.

A further object of this invention is to provide such a flash extender which is usable with a camera having a socket for receiving and indexing a percussively ignitable multilamp flash unit.

Yet another object of the present invention is to provide such a flash extender which is compact, simple, and inexpensive.

These and other objects of this invention are accomplished by a flash extender which includes a housing having a top and a bottom wall, a multilamp flash unit socket in the top wall of the housing, a plurality of push rods extending between the top and bottom walls of the housing, and a base extending downwardly from the bottom wall of the housing which is releasably receivable by the flash unit socket of a photographic camera. The lower end of each push rod is aligned with an aperture in the bottom wall of the extender. Rotation of the flash extender, as the camera flash unit socket is indexed to a firing position, positions one of the apertures in the bottom wall over the flash sensing and actuating mechanism of the camera, thereby aligning the corresponding push rod with the flash sensing and actuating mechanism. Actuation of the camera shutter release mechanism causes the aligned push rod to be urged upwardly by the camera flash sensing and actuating mechanism through the aperture in the top wall of the flash extender, thereby sensing the presence of a fresh flashlamp. Continued upward movement of the pushrod causes actuation of a flashlamp held in the multilamp flash socket of the flash extender.

In another embodiment of this invention, the flash extender includes a multilamp flash unit socket and a plurality of push rods arranged about a central mounting spider which is releasably receivable by a multilamp flash unit socket in a photographic camera. The push rods extend through apertures in a shoulder of the central spider which is spring biased to releasably hold the push rods against movement in an inactive position when the extender is separated from a photographic camera. The upper end of each push rod extends through an aperture in a top wall of the flash extender so as to be in proper position for actuating a flash unit received by the extender socket. The lower end of each push rod is aligned with an aperture in a bottom wall of the flash extender. Movement of the central spider upward by its mating with the flash unit socket in a photographic camera frees the push rods for subsequent movement upwardly through the apertures in the top wall of the flash extender. Rotation of the camera socket to a firing position causes rotation of the flash extender therewith so that one of the apertures in the bottom wall of the extender is positioned over the camera flash sensing and actuating mechanism, thereby aligning the corresponding push rod over the camera flash sensing and actuating mechanism. Actuating of the camera shutter release mechanism results in movement upwardly of the aligned push rod under urging of the flash sensing and actuating mechanism of the camera. Initial upward movement causes sensing of a fresh flashlamp with continued upward movement of the push rod causing actuation of a flashlamp held in the flash socket of the flash extender.

BRIEF DESCRIPTION OF THE DRAWINGS

In the detailed description of the preferred embodiment of the invention presented below, reference is made to the accompanying drawings, in which:

FIG. 1 is a pictorial view of an extender according to one embodiment of this invention mounted on a camera, with a multilamp flash unit mounted on the flash extender;

FIG. 2 is an enlarged, exploded view showing the base of a multilamp flash unit with the mating socket of the flash extender of this invention;

FIG. 3 is an enlarged, exploded view showing the base of the flash extender of this invention with the mating camera socket;

FIG. 4 is an enlarged view of the flash extender of this invention with portions of the flash extender removed to reveal the interior working components of the embodiment;

DETAILED DESCRIPTION OF THE INVENTION

Figure 5:
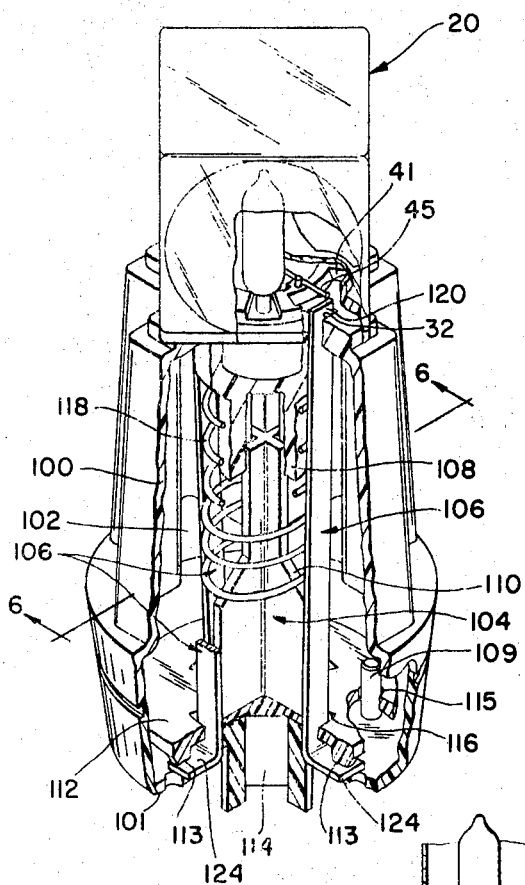
FIG. 5 is a perspective view of another embodiment of this invention, with portions cut away to reveal interior working components thereof.

Because cameras are well known, the present description will be directed in particular to camera elements forming part of, or cooperating more directly with, apparatus in accordance with the present invention. It is to be understood that camera or flash elements not specifically shown or described may take various forms well known to those skilled in the art.

Figures 1, 2, 3, 4:
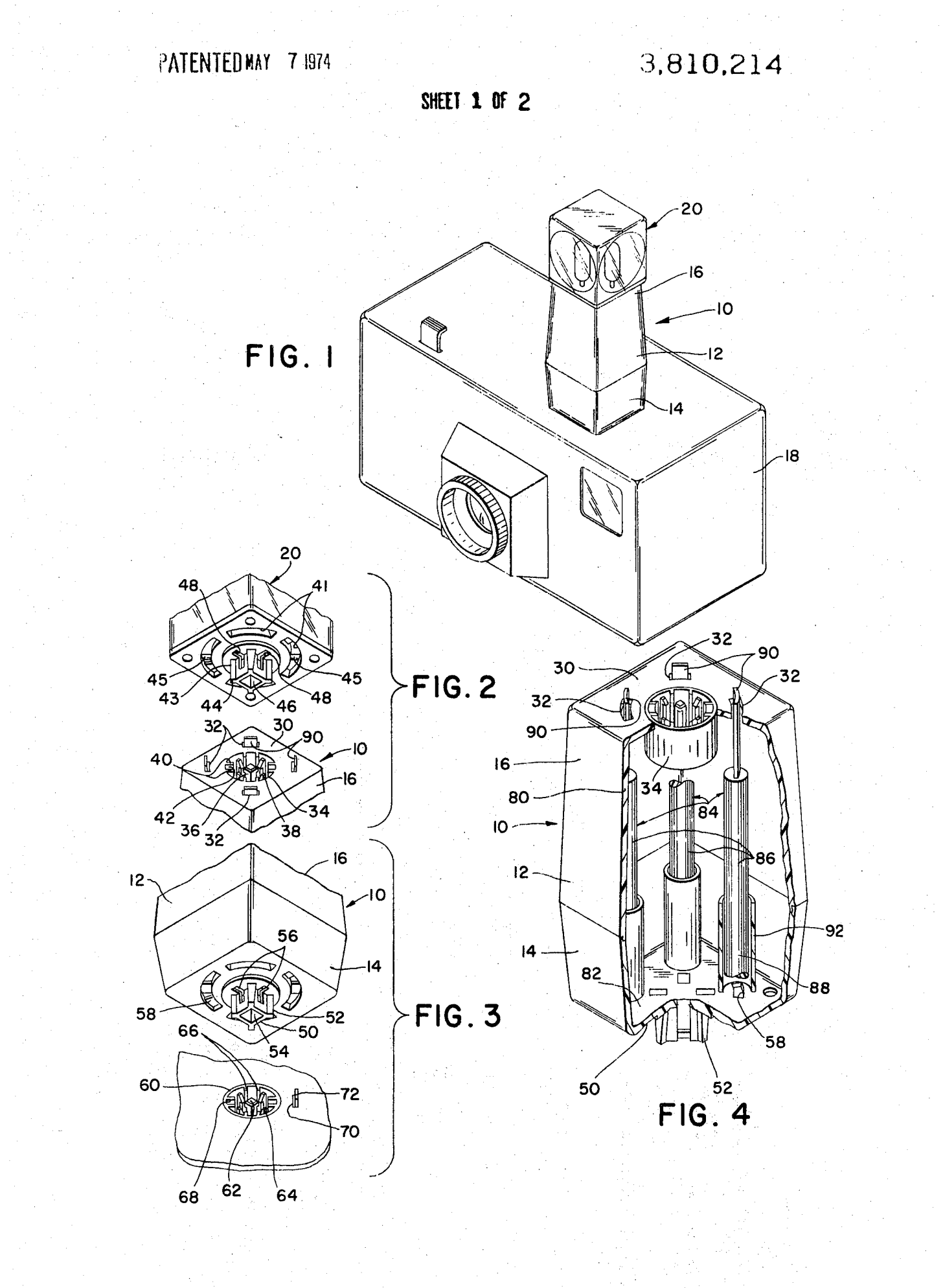

Referring now to FIG. 1, a flash extender 10 according to this invention includes a housing 12, a camera mating portion 14, and a flash unit mating portion 16. Flash extender 10 is shown mounted on the flash socket of a photographic camera 18, with a multilamp flash unit 20 coupled to flash unit mating portion 16 of flash extender 10.

As may best be seen in FIG. 2, flash unit mating portion 16 of flash extender 10 includes a top wall 30 having four apertures 32 equispaced around its periphery and a central flashlamp socket 34. Flashlamp socket 34 has a centerpost 36, four latches 38 and a plurality of inwardly extending walls 40 which define four recesses 42. Flash unit 20 has four apertures 41 in its bottom wall which provide access to four strikers 45, each movable from a pre-energized position to percussively fire a flashlamp unit 20. Flash unit 20 further has a downwardly extending base 43 formed with integral walls 44 which mate with recesses 42, a central recess 46 which receives centerpost 36, and cam surfaces 48 which mate with latches 38. Centerpost 36, latches 38 and recesses 42 are designed to receive and releasably retain flash unit 20. Apertures 32 in top wall 30 are positioned so as to be aligned with apertures 41 in the bottom wall of a flash unit 20 which is mounted on flash extender 10.

Camera mating portion 14 of flash extender 10 is substantially identical to the bottom of flash unit 20, as may be seen in FIG. 3, and includes a downwardly extending base 50 formed with integral walls 52, a central recess 54, cam surfaces 56 and four apertures 58 which provide access to the interior of housing 12 of extender 10. Socket 60, in the top of camera 18, is substantially identical to socket 34 and has a centerpost 62, four latches 64 and a plurality of inwardly extending walls 66 which define four recesses 68. It may be seen that one of th apertures 58 in flash extender 10 may be aligned with an aperture 70 in the top of camera 18, when camera mating portion 14 of flash extender 10 is coupled to socket 60, by rotating socket 60 to the position illustrated in FIG. 3. Alignment of aperture 58 with aperture 70 insures that a flash sensing and actuating member 72 of camera 18, which extends through aperture 70, may extend through aperture 68 into the interior of housing 12 of flash extender 10.

As shown in FIG. 4, extender 10 consists of a housing 12 having a top wall 30 in which socket 34 is formed, side walls 80 downwardly depending from top wall 30 and a bottom wall 82 in which are formed apertures 58. In the interior of housing 12 of flash extender 10 are positioned four push rods 84, each of which includes a central generally cylindrical portion 86, a lower end 88 and an upper flash actuating end 90 which extends through aperture 32 in top wall 30 of flash extender 10. Central portion 86 of each push rod 84 fits within a generally cylindrical sleeve 92 which extends upwardly from bottom wall 82 of flash extender 10. Each sleeve 92 is aligned with an aperture 58 so that the lower end 88 of each push rod 84 is aligned with an aperture 58.

In operation, flash extender 10 is coupled with a camera by mating walls 51, recess 54 and cam surfaces 56 with recesses 68, centerpost 62 and latches 64, respectively. One of apertures 58 is aligned with aperture 70 of the camera when the camera socket is in firing position thereby aligning flash sensing and actuating member 72 of the camera with lower end 88 of push rod. A flash unit may now be inserted in socket 34 of flash extender 10. Upon actuation of the shutter release mechanism of the camera, actuating member 72 moves upward, thereby urging a push rod 84 in an upward direction. Push rod 84 sequentially senses and then causes firing of the flashlamp immediately above upper end 90 of push rod 84 by release of its pre-energized striker. In a camera which is not adapted for sequential sensing and firing, push rod 84 will move upwardly to fire the corresponding flashlamp by release of its pre-energized striker.

Indexing of a received unit to present a fresh flashlamp in firing position may be done by any method in the art. In the embodiment shown in FIG. 1, flash extender 10 is rotatable along with camera socket 60 in response to actuation of camera elements (not shown) for indexing flashcubes mounted on the camera socket 60 after actuation of a flash unit. The camera could be adapted to automatically rotate its flash receiving socket with each operation of the film advance mechanism, or the camera flash socket could be rotated after operation of the shutter release mechanism. In either case, actuation of the flash indexing mechanism of the camera causes rotation of camera socket 60 which is imparted to flash extender 10, thereby moving a fresh flash unit to a firing position for actuation. Alternatively, extender socket 34 could be directly coupled to camera socket 60 for rotation therewith while extender housing 12 remains stationary or flash indexing could be achieved by manual rotation by the operator of a flash unit mounted on extender 10.

Figure 6:
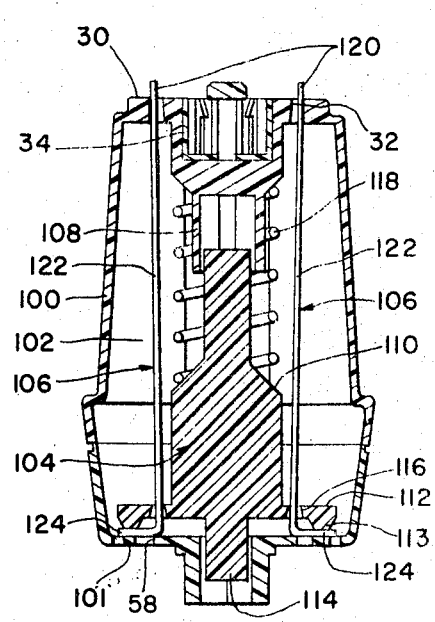
FIG. 6 is an enlarged section view taken along the lines 6—6 of FIG. 5, showing the central stud of the flash extender of FIG. 5 in its inactive position, when not mated to a photographic camera.
Figure 7:
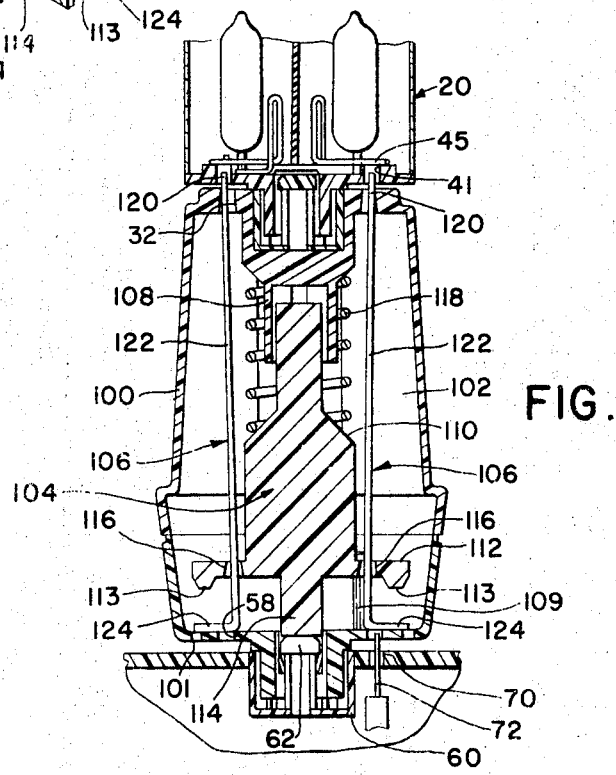
FIG. 7 is an enlarged section view taken along the line 6—6 of FIG. 5, showing the flash extender of FIG. 5 mated to a camera, with a multiplier flash unit coupled to the flash extender.

Referring now to FIGS. 5–7, housing 12 of flash extender 10 includes side wall 100 depending downwardly from top wall 30 to a bottom wall 101. Top wall 30, side wall 100 and bottom wall 101 define an inner chamber 102 in which are disposed a central spider 104 and four push rods 106. It may be seen that socket 34 extends downwardly through wall 30 into chamber 102 and terminates in a sleeve 108. A mounting pin 109 extends upwardly from bottom wall 101.

Spider 104 consists of four flutes 110, a flange 112, four lugs 113 and a central stud 114 depending downwardly from flange 112. Flange 112 further defines a mounting aperture 115 and four apertures 116 which may be aligned between apertures 58 in camera mating portion 14 and apertures 32 in top wall 30 of flash extender 10. Spider 104 is biased downwardly by a spring 118 which is held between socket 34 and flutes 110. When assembled, the upper portions of flutes 110 extend into sleeve 108 while central stud 114 extends into recess 54 and mounting pin 109 extends into aperture 115. Spring 118 then urges spider 104 in a downward direction.

Each push rod 106 has an upper end 120, a generally straight middle portion 122 and a lower bent portion 124. Push rods 106 are assembled with spider 104 so that upper ends 120 of push rods 106 extend through apertures 32 in top wall 30, middle portions 122 extend through apertures 116 in flange 112 of spider 104 and bent portions 124 of push rods 106 are aligned with apertures 58 of flash extender 10. It may be seen in FIG. 6 that when spider 104 is urged downwardly by spring 118, lugs 113 on spider 104 rest on push rods 106, which are thereby held against bottom wall 101 of flash extender 10, in an inactive position.

For operation, a flash unit 20 is coupled to extender 10 by mating walls 44, recess 46 and cam surfaces 48 with recesses 42, centerpost 36 and latches 38, respectively. Upper ends 120 of push rods 106, which extend through apertures 32 in top wall 30, will now be aligned with apertures 41 in flash unit 20. During coupling of flash extender 10 with socket 60 of a photographic camera, central stud 114 impinges upon centerpost 62 of flash socket 60, thereby forcing spider 104 upward against the urging of spring 118 and freeing push rods 106. It may be seen that one push rod 106 has a bent portion 124, which is aligned with an aperture 58 of the extruder thereby aligning bent portion 124 with sensing and actuating member 72 of the camera when camera socket 60 is in firing position. Release of the shutter actuating member of the camera thereby actuates flash actuating member 72 for movement in an upward direction. Flash actuating member 72 inpinges upon bent portion 124, thereby forcing push rod 106 in an upward direction, raising upper end 120 into the interior of unit 20. Push rod 106 sequentially senses a good flashlamp and causes firing of the flashlamp by release of its pre-energized striker.

The invention has been described in detail with particular reference to the preferred embodiments thereof, but it will be understood that variations and modifications can be effected within the spirit and scope of the invention.

We claim:

1. An extender for use with a camera of the type having:
   means for receiving a flash unit having at least one lamp ignitable by the application of mechanical force to the unit; and
   means for applying a mechanical force to a received unit to ignite a lamp in the received unit;
   said extender comprising;
   means for receiving a flash unit having at least one lamp ignitable by the application of mechanical force to the unit;
   means for mounting said extender on a camera; and means, located for cooperating with the force applying means of a camera on which said extender is mounted, for applying a mechanical force to a received unit to ignite a lamp in said unit in response to receipt of a force from the force-applying means of a camera on which said extender is mounted.

2. An extender according to claim 1 wherein said extender force-applying means includes at least one push rod operable in response to receipt of a force from the force-applying means of a camera on which said extender is mounted.

3. An extender for use with a camera having a socket for receiving a percussion ignitable flashlamp and means for applying a mechanical force to a received flashlamp to cause actuation of the flashlamp, said extender comprising:
   a socket for receiving a percussion ignitable flashlamp;
   means for mounting said extender on a camera; and means, including at least one push rod located for receiving a force from the force applying means of a camera on which said extender is mounted, for actuating a received flashlamp in response to actuation of the force applying means of a camera on which said extender is mounted.

4. An extender for use with a camera having:
   a socket for receiving a flash unit having a plurality of percussion ignitable flashlamps;
   means for indexing the socket to locate a flashlamp of a unit received therein at a camera firing position; and
   means for actuating firing of the flashlamp located at the camera firing position;
   said extender comprising:
   means for receiving a flash unit having a plurality of percussion ignitable flashlamps;
   means for coupling said extender receiving means to such a camera and for supporting said extender receiving means displaced from a socket to which it is coupled, said coupling means being operable to index said extender receiving means to locate a flashlamp of a unit received therein at an extender firing position corresponding to the camera firing position in response to indexing of a camera socket to which said extender receiving means is coupled; and means, located for cooperation with the actuating means of a camera to which said extender is coupled, for actuating firing of the flashlamp of a received multilamp unit located at said extender firing position in response to actuation of the actuating means of a camera to which extender receiving means is coupled.

5. An extender according to claim 4 wherein said extender actuating means includes at least one push rod being operable to actuate firing of the flashlamp located at said extender firing position in response to actuation of the actuating means of a camera to which said extender receiving means is coupled.

6. An extender for use with a camera having:
a socket for receiving a percussion ignitable multilamp flash unit;
means for indexing the socket to locate a flashlamp of a received unit at a camera firing position; and means for actuating a flashlamp located at the camera firing position;
said extender comprising:
a socket for receiving a percussion ignitable multilamp flash unit;
means for coupling said extender socket to such a camera indexing means, said coupling means being operable to index said extender socket to locate a flashlamp of a received unit in an extender firing position corresponding to a camera firing position in response to indexing of a socket of a camera to which said extender is coupled; and
means, including a plurality of push rods, one of said push rods being located for cooperation with the actuating means of a camera to which said extender is coupled, for actuating the flashlamp located at said extender firing position in response to actuation of the actuating means of a camera to which said extender socket is coupled.

7. For use with flashlamp units of the type having a plurality of lamps fireable by striking and a pre-energized striker associated with each such lamp and releasable to effect such striking; and further for use with a camera of the type having a rotatable socket for receiving such a flashlamp unit, means for rotating the socket to sequentially locate the flashlamps of a received unit at a camera firing position and means movable from a first position to a second position for releasing a pre-energized striker of a received unit to fire its associated flashlamp;

a flashlamp extender comprising:
an elongated housing having opposed ends;
means positioned at one end of said housing for receiving and positioning such a flashlamp unit with the pre-energized strikers thereof in respective predetermined positions;
means positioned at the other end of said housing for coupling said housing to the socket of such a camera in a manner such that said extender can rotate with the camera socket to sequentially locate the flashlamps of a received unit at an extender firing position; and
a plurality of push rods, one for each of the pre-energized strikers of a received unit, said push rods extending between said opposed ends of the housing and being movable between first and second positions, and each of said push rods having first and second ends, wherein:
said respective first ends including means, sequentially alignable, when said housing is coupled to a camera, with the releasing means of a camera in response to rotating of the socket of the camera, for moving said push rod having its first end means aligned with the camera releasing means from its first to its second position; and
said respective second ends include means, aligned with the pre-energized strikers of a received unit when the strikers are in their predetermined position, for releasing the aligned striker in response to movement of said push rod from its first to its second position.

8. For use with flashlamp units of the type having a plurality of lamps fireable by striking and a pre-energized striker associated with each such lamp and releasable to affect such striking; and
further for use with a camera of the type having a rotatable socket for receiving such a flashlamp unit and means movable from a first position to a second position for releasing a pre-energized striker of a received unit to fire its associated flashlamp;
a flashlamp extender comprising:
an elongated housing having opposed ends;
means, including a rotatable socket, positioned at one end of said housing for receiving and positioning such a flashlamp unit with the pre-energized strikers thereof in respective predetermined positions;
means positioned at the other end of said housing for coupling said housing to the socket of such a camera; and
a push rod extending between said opposed ends of the housing and movable between the first and second positions, said push rod having first and second ends, wherein:
said first end includes means, aligned with the releasing means of a camera to which said housing is coupled, for moving said push rod from its first and its second position in response to movement of the camera releasing means from its first to its second position; and
said second end includes means, alignable with a pre-energized striker of a received unit when the striker is in its predetermined position, for releasing the aligned striker of a received unit in response to movement of said push rod from its first to its second position.

9. For use with flashlamp units of the type having a plurality of lamps fireable by striking and a pre-energized striker associated with each such lamp and releasable to effect such striking; and
further for use with a camera of the type having a rotatable socket for receiving such a flashlamp unit, means for rotating the socket to sequentially locate the flashlamps of a received unit at a camera firing position and means movable from first position to a second position for releasing a pre-energized striker of a received unit to fire its associated flashlamp;
a flashlamp extender comprising:
an elongated housing having opposed ends;
means, including a rotatable socket, positioned at one end of said housing for receiving and positioning such a flashlamp unit with the pre-energized strikers thereof in respective predetermined positions;

means positioned at the other end of said housing for coupling said extender receiving means to the socket of such a camera so that said extender socket can rotate with the camera socket to sequentially locate the flashlamps of a received unit at an extender firing position; and a push rod extending between said opposed ends of the housing and movable between first and second positions, said push rod having first and second ends, wherein:

said first end includes means, aligned with the releasing means of a camera to which said extender receiving means is coupled, for moving said push rod from its first to its second position in response to movement of the camera releasing means from its first to its second position; and said second end includes means, alignable with a pre-energized striker of received unit when the striker is in its predetermined position, for releasing the aligned striker of a received unit in response to movement of said push rod from its first to its second position.

10. For use with flashlamp units of the type having a plurality of lamps fireable by striking and a pre-energized striker associated with each such lamp and releasable to effect such striking; and further with use with a camera of the type having a rotatable socket for receiving such a flashlamp unit and means movable from a first position to a second position for releasing a pre-energized striker of a received unit to fire its associated flashlamp;

a flashlamp extender comprising:

an elongated housing having opposed ends;

means positioned at one end of said housing for receiving and positioning such a flashlamp unit with the pre-energized strikers thereof in respective predetermined positions;

means positioned at the other end of said housing for coupling said housing to the socket of such a camera; and a plurality of push rods, one for each of the pre-energized strikers of a received unit, said push rods extending between said opposed ends of the housing and being movable between first and second positions, and each of said push rods having first and second ends, wherein:

said respective first ends include means, alignable with the releasing means of a camera to which said housing is coupled, for moving said respective push rod having its first end means aligned with the camera releasing means from its first to its second position in response to movement of the camera releasing means from its first to its second position; and said second ends include means, aligned with pre-energized strikers of a received unit when the strikers are in their predetermined positions, for releasing the aligned striker of a received unit in response to movement of said push rod from its first to its second position.

11. An extender as in claim 10 wherein said extender receiving means includes a rotatable socket.

* * * * *

UNITED STATES PATENT OFFICE
CERTIFICATE OF CORRECTION

PO-1050 (5/69)

Patent No. 3,810,214  Dated May 7, 1974

Inventor(s) Harold L. Malone    Robert J. Bodensteiner

It is certified that error appears in the above-identified patent and that said Letters Patent are hereby corrected as shown below:

| | |
|---|---|
| Column 3, line 38 | Delete "multiplier" and substitute therefor --multilamp-- |
| Column 4, line 17 | Delete "th" and substitute therefor --the-- |
| Column 4, line 24 | Delete "68" and substitute therefor --58-- |
| Column 4, line 42 | Delete "51" and substitute therefor --52-- |
| Column 4, line 47 | After "rod" please insert --84-- |
| Column 5, line 13 | After "includes" please insert --a-- |
| Column 5, line 59 | Delete "extruder" and substitute therefor --extender-- |
| Column 6, line 16 | Delete ";" and substitute therefor --:-- |
| Column 6, line 61 | After "camera" please insert --socket-- |
| Column 7, line 8 | After "which" please insert --said-- |
| Column 8, line 60 | After "from" please insert --a-- |
| Column 9, line 21 | After "of" please insert --a-- |

Signed and sealed this 17th day of September 1974.

(SEAL)
Attest:

McCOY M. GIBSON JR.
Attesting Officer

C. MARSHALL DANN
Commissioner of Patents